(12) United States Patent
Winkler

(10) Patent No.: US 8,640,854 B2
(45) Date of Patent: Feb. 4, 2014

(54) STOP UNIT OF A CLIP CONVEYOR

(71) Applicant: SSI Schaefer Peem GMBH, Graz (AT)

(72) Inventor: Max Winkler, Graz (AT)

(73) Assignee: SSI Schaefer Peem GmbH, Graz (AT)

( * ) Notice: Subject to any disclaimer, the term of this patent is extended or adjusted under 35 U.S.C. 154(b) by 0 days.

(21) Appl. No.: 13/682,994

(22) Filed: Nov. 21, 2012

(65) Prior Publication Data
US 2013/0140139 A1 Jun. 6, 2013

(30) Foreign Application Priority Data
Nov. 21, 2011 (DE) .......................... 10 2011 119 411

(51) Int. Cl.
*B65G 19/02* (2006.01)
*B65G 19/26* (2006.01)

(52) U.S. Cl.
CPC ............... *B65G 19/02* (2013.01); *B65G 19/26* (2013.01)
USPC ...................... 198/465.4; 198/463.4; 198/687

(58) Field of Classification Search
USPC .................. 198/463.4, 463.6, 465.4, 685–687
See application file for complete search history.

(56) References Cited

U.S. PATENT DOCUMENTS

| | | | |
|---|---|---|---|
| 2,930,510 A | 3/1960 | Pallissard | |
| 3,799,395 A | 3/1974 | Vanderpool | |
| 5,806,657 A * | 9/1998 | Enderlein et al. | 198/680 |
| 5,819,906 A * | 10/1998 | Enderlein et al. | 198/687.1 |
| 6,609,608 B2 * | 8/2003 | Schneuing | 198/465.4 |

FOREIGN PATENT DOCUMENTS

| | | | | |
|---|---|---|---|---|
| DE | 37 37 484 A1 | 5/1989 | | |
| DE | 90 03 011.7 U1 | 7/1991 | | |
| DE | 195 27 819 A1 | 1/1997 | | |
| DE | 196 14 905 A1 | 11/1997 | | |
| DE | 196 27 449 A1 | 1/1998 | | |
| DE | 298 04 038 A1 | 7/1998 | | |
| DE | 29915523 U1 * | 2/2000 | ............. | B65G 25/10 |
| DE | 20311926 U1 * | 9/2003 | ............. | B65G 19/26 |
| DE | 103 17 742 B3 | 7/2004 | | |
| FR | 2 755 112 A1 | 4/1998 | | |
| NL | 1 006 376 C1 | 12/1998 | | |

OTHER PUBLICATIONS

German Examination Report dated May 25, 2012.
European Search Report for corresponding European Application No. 12193598.5 mailed Feb. 18, 2013.

* cited by examiner

*Primary Examiner* — Mark A Deuble
(74) *Attorney, Agent, or Firm* — Renner, Otto, Boisselle & Sklar, LLP

(57) ABSTRACT

A stop unit comprising: a guiding device which can be mounted to an overhead conveyor; a carriage having an abutting section, wherein the carriage is movably supported by the guiding device along a transverse direction which is orientated transversely relative to a longitudinal direction; and a drive which is coupled to the carriage and which is configured to extract, during activation, the carriage from a release position.

17 Claims, 6 Drawing Sheets

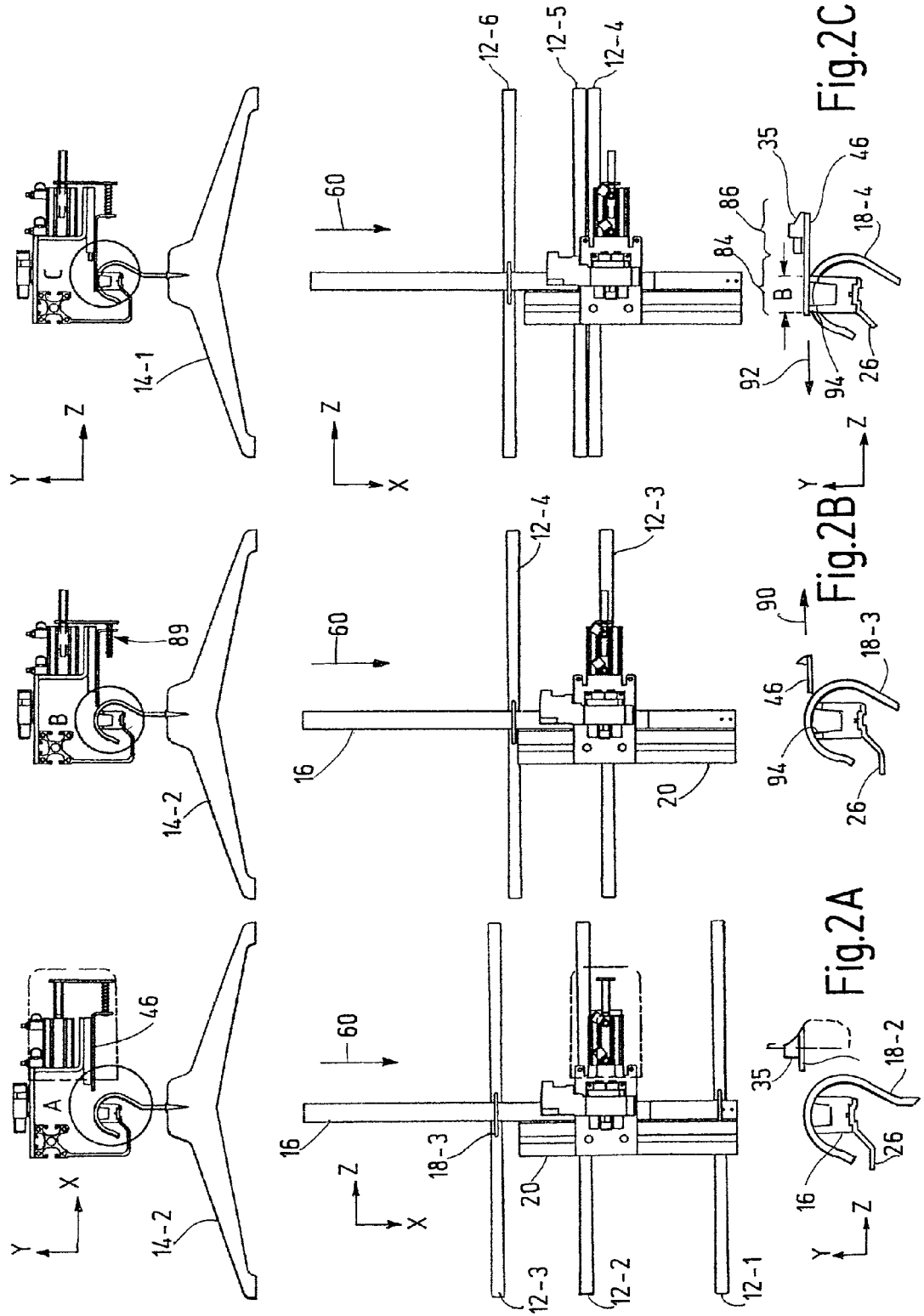

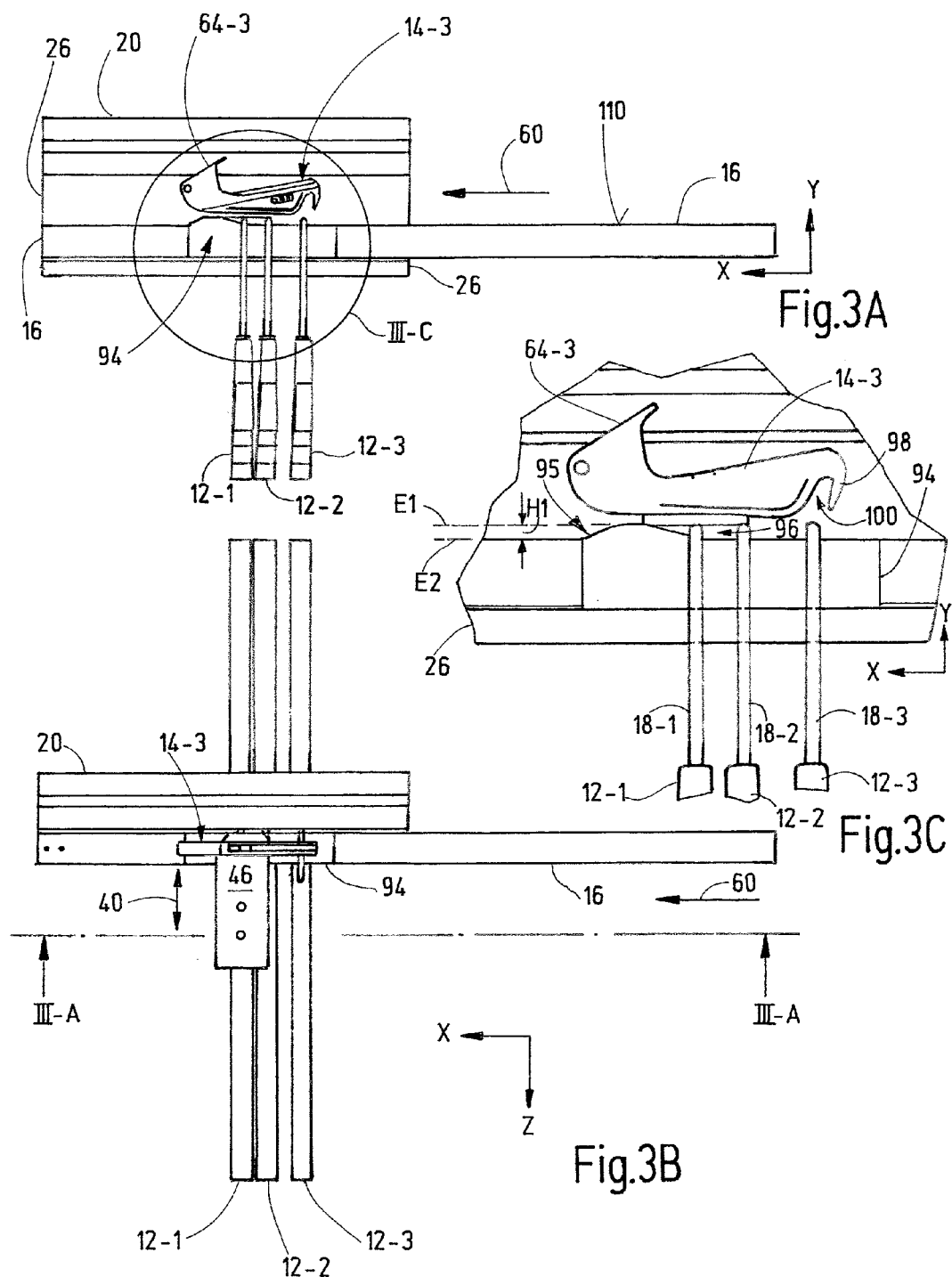

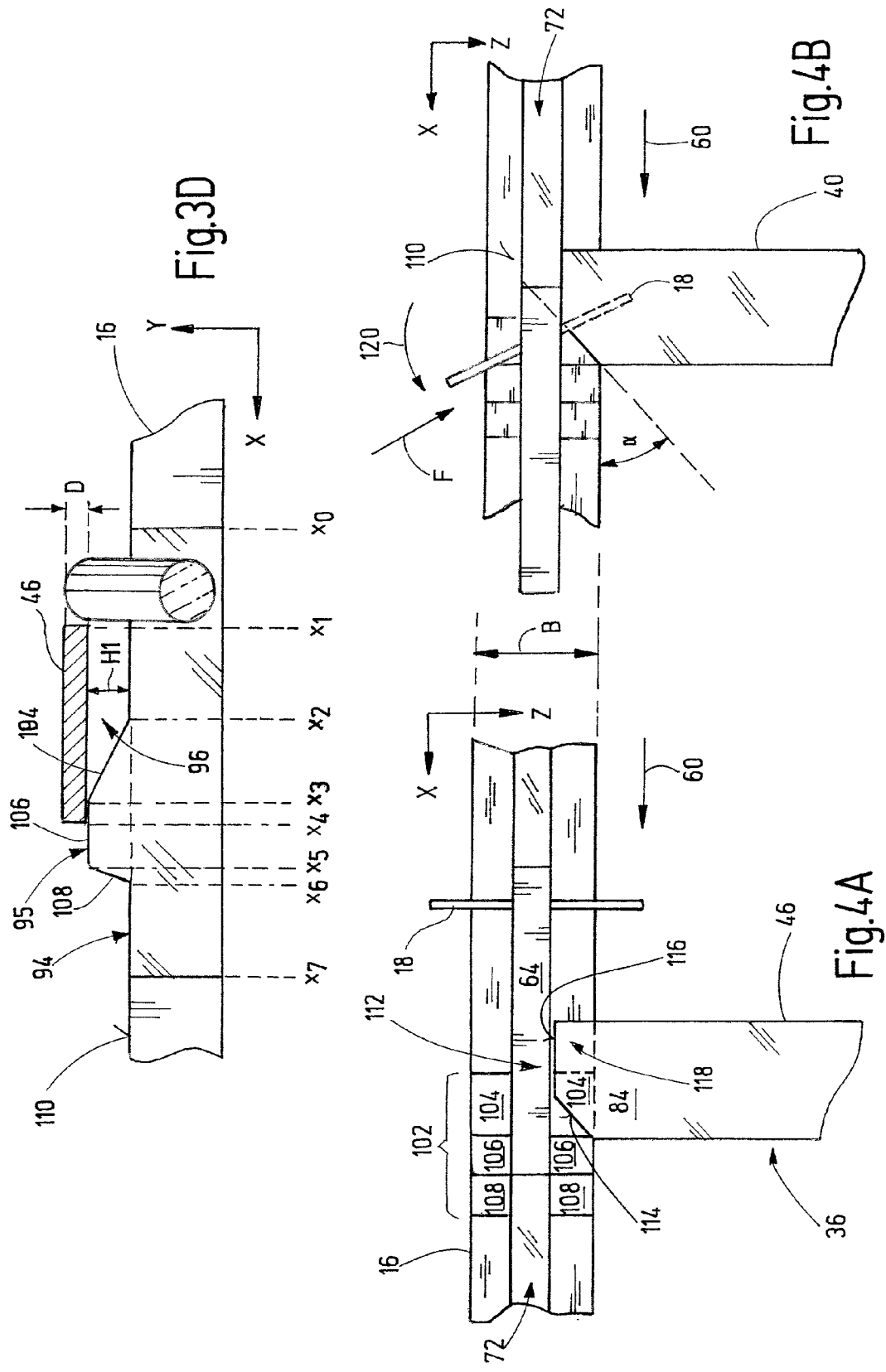

STOP UNIT OF A CLIP CONVEYOR

CROSS REFERENCE TO RELATED APPLICATIONS

This application claims the priority of the German patent application DE 10 2011 119 411.1, entitled "Stopper-Einheit für Klinkenförderer" and filed on Nov. 21, 2011, which German patent application is incorporated herewith by reference.

BACKGROUND OF THE INVENTION

The present invention relates to a stop unit (which can also be installed later) of an overhead conveyor which transports a clip driver downstream in a slot of a supporting rail, on which supporting rail hangers are slidingly transported by means of the clip drivers, the slot being open at least at one side and the conveying direction being orientated in parallel relative a longitudinal direction of the supporting rail. The invention further relates to a corresponding overhead conveyor including the stop unit.

RELATED PRIOR ART

Clip drivers of clip conveyors are generally disclosed in the documents DE 299 15 523 U1 and DE 298 09 909 U1. With clip conveyors hanging products such as garments on coat hangers are conveyed by means of transportation hooks on sliding rails and by means of traction members, which are guided above the sliding rail, wherein a plurality of hanging clips are pivotally mounted to the traction member at distances. As a rule, conveyors of this type comprise traction members in terms of endless chains, wherein the individual clips are attached to the traction members in distances. The clips are pivotally attached to the chain so that they hang and drive the individual transportation hooks (hangers) by means of the driver hooks thereof. For example, transportation hooks of this type are the hooks of coat hangers which are frequently used as means for transporting garments in the textile industry.

The German utility model DE 203 11 926 U1 discloses an overhead conveyor system. Also in this case a clip is supported pivotally around a downstream axis relative to a carrier, which is connected to the overhead conveyor, wherein a driver hook is pivotally connected to an upstream end, the driver hook being biased in the conveying direction by means of a traction spring. Again, a conveying chain is used as a traction member. The conveying chain carries clip drivers at its bottom side. Each of the clip drivers comprises a carrier, to which carrier a clip is pivotally attached by means of a joint, namely at the downstream end of the clip, i.e. the carrier. The clip comprises—at an upstream end relative to the conveying direction—one driver hook which points downwardly to the conveying rail. A downstream recess, relative to the conveying direction, is located in the clip opposite relative to the hook. A switching cam, which is again located downstream relative to this recess, is provided in terms of an area, which is formed at a bottom side of the clip and which is curved downwardly. At one location of the conveying rail, which can be chosen arbitrarily, a so-called clip opener can be provided. Connected hangers can be released from the clips by means of the clip opener. Released hangers are accumulated at the location of the clip opener. The conveying rail comprises a recess which is open upwardly, in which recess an opening lever is supported pivotally having two arms. In a resting position, the opening lever is located within the recess so that connected hangers can pass unhinderedly. In an operating position, the opening lever is pivoted out of the recess. Then, the switching cam of an approaching clip contacts a front part of the opening lever, which has been pivoted to the outside. Thereby, the clip is pivoted upwardly, i.e. is pivoted away from the conveying rail. In this manner the hanger is released.

Such clips have a so-called "power-and-free functionality". As a rule, each of the clips conveys one hanger. However, sometimes also a number of hangers is conveyed.

The opener (stop device), as described above, is disadvantageous in that a designer already needs to determine during the planning phase the location where the stop device is to be positioned later, in order to integrate the stop device. Transferring or placing the stop device at a later time is very time-consuming. Installation of additional stop devices "on site" requires many efforts. The conveying rail needs to be opened by using a saw, and additional supporting devices need to be attached. For integrating an opening lever into the bottom of the rail, holes or slots need to be inserted into the conveying rail from above. Hooks of hangers can be caught in these holes or slots. This can result in an undesired stop, or even damage.

The document DE 196 14 905 A1 discloses a conveying bag for use in an overhead conveyor system including a discharge station. The document DE 90 03 011 U1 discloses a station for separating coat hangers. The document DE 103 17 742 B3 discloses an accumulation section of an overhead conveyor system including clip drivers.

SUMMARY OF THE INVENTION

Therefore, it is an object of the present invention to provide an improved stop unit which can also be installed later.

This object is generally solved by a stop unit of an overhead conveyor transporting clip drivers in a slot of a supporting rail, the slot being open on at least one side, wherein hangers are slidingly transported by means of the clip drivers downstream along a conveying direction which is orientated in parallel relative to a longitudinal direction of the supporting rail, comprising: a guiding device which can be mounted to the overhead conveyor; a carriage having an abutting section, wherein the carriage is movably supported, preferably linearly, by means of the guiding device along a transverse direction which is orientated across the longitudinal direction; and a drive which is coupled to the carriage and which is configured to extend, during activation, the carriage from a release position, in which position the abutting section of the carriage does not project over the supporting rail so that the hangers can pass the carriage, to a stop position along the transverse direction, in which stop position the abutting section projects over the supporting rail, preferably over an entire width thereof; wherein the carriage, if the drive is activated, can be retracted to the release position in case of an action of force along the transverse direction in case and rests in a current position thereof in case of an action of force which is only exerted along the longitudinal direction. The stop unit can be installed later in the overhead conveyor system, the system comprising the supporting rail, clip drivers and hangers.

According to another aspect of the invention it is disclosed a stop unit for use in an overhead conveyor system comprising clip drivers, a supporting rail and hangers, which clip drivers are transported in a slot of the supporting rail, the slot being open at at least one side of the supporting rail, wherein the hangers are slidingly transported downstream by means of the clip drivers along a conveying direction which is orientated in parallel relative to a longitudinal direction of the supporting rail, the stop unit comprising: a guiding device which is mountable to the overhead conveyor; a carriage having an abutting section, wherein the carriage is movably supported, preferably linearly, by means of the guiding device along a transverse direction, which is orientated transversely to the longitudinal direction; and a drive which is coupled to the carriage, which drive is configured to drive, during its activation, the carriage from a release position, in which release position the abutting section of the carriage does not project over the supporting rail so that the hangers can pass the carriage without colliding therewith, to a stop position along the transverse direction, in which stop position the abutting section projects over an entire width of the supporting rail, preferably over an entire width thereof such that the hangers are released and accumulated by the abutting section while the clip drivers are continuously moved downstream; wherein the carriage, in an activated state of if the drive, is retractable to the release position in case of an action of force along the transverse direction, and rests in a current position in case of an action of force which is only exerted along the longitudinal direction.

The stop unit of the invention can be installed later. The stop unit can be mounted laterally without cutting the supporting rail by using a saw or disassembling same. The stop unit can be installed an arbitrarily location of the conveying path. The stop unit has a two-stage configuration, wherein a first stage of the carriage is spring biased. If the carriage hits a hanger or even a clip during extension, at maximum only a small force of the spring device is applied to the hanger or the clip. Damages are prevented. As soon as the obstacle (hanger/clip) passes by, a second stage of the carriage applies. The carriage is completely extended between the clips and hangers. The carriage, in this position, stops the other clips, and the hangers are accumulated in front of the carriage.

However, if the carriage hits one of the hangers, the hanger will still be transported by the engaging clip and will not be released randomly.

The transport rail is not interrupted and does not require additional holes or slots for mounting the stop unit, in which holes or slots the hangers or the hooks could get caught.

The stop unit can be mounted at any place and at any time, or even later. The stop unit is absolutely fault tolerant. It can be manufactured in a simple and cost-efficient manner. It does not exist any undefined state if the carriage is activated and then hits one of the hangers or clips.

In accordance with a preferred embodiment the abutting section comprises a first front face at a free end which is orientated towards the supporting rail, wherein the first front face is orientated obliquely relative to the longitudinal direction of the supporting rail, so that the free end defines a tip at an upstream location.

The obliquely orientated first front face is required for an introduction of force in case of the carriage hitting one of the clips or hangers just passing the stop unit, during the activation thereof. In this instance, a retracting force is introduced by the hanger itself, in order to prevent damage of the system.

Further, it is advantageous if the abutting section comprises a second front face being orientated in parallel relative to the longitudinal direction and which follows the first front face in an upstream direction, wherein the second front face defines the tip.

The second (parallel) front face can contact the clip in a planar manner, and guides the clip around the carriage until the hanger reaches the first oblique face. Also in this manner damages are prevented.

With another preferred embodiment the stop unit further comprises a spring device arranged between the carriage and the drive so that the carriage, in an activated state, can be returned to the release position, wherein the carriage preferably comprises a spring-contact section.

The spring device absorbs the force which is exerted by the drive, during a change of the carriage from the release position to the stop position, to the carriage although the carriage cannot be extended completely over the entire width of the supporting rail due to a clip driver which is in the way. Damage of the stop unit is prevented in this manner.

Further it is preferred: that the drive comprises a cylinder having a piston rod, that the piston rod is connected to a connecting element, that the connecting element is connected to a shaft which is supported in a freely movable manner in an opening of the carriage, and that the spring device is arranged between the carriage and the connecting element.

The stop unit is positioned laterally relative to the supporting rail and, therefore, can be accessed well for the sake of installation and maintenance. The previously known switches or openers were integrated into the supporting rail and could not be accessed or maintained conveniently.

Further, it is advantageous if the stop unit further comprises: a supporting-rail elevation which is connectable to the supporting rail and formed such that height of an intermediate space between the supporting rail and the carriage, which projects over the supporting rail in the stop position, reduces in a downstream direction such that a hanger, which is not in engagement with one of the drivers, can penetrate the intermediate space, but cannot pass the intermediate space in a downstream direction.

By this measure, hangers having different (wire) hook thicknesses can be handled without prone to failure.

With another preferred embodiment the supporting-rail elevation is adapted to a shape of the supporting rail such that the supporting-rail elevation replaces part of the supporting rail, can be clipped to the supporting rail from the outside, or can be fixed thereto.

The supporting rail does not need to be cut by using a saw, or to be manipulated otherwise, for mounting the stop unit. The supporting-rail elevation is simply clipped-on from the outside and fixed to an arbitrary location. Mounting is simple and fast.

With another advantageous embodiment the supporting-rail elevation comprises a rise which projects over a sliding area of the supporting rail, and which preferably comprises an increasing flank, a plateau extending in parallel relative to the sliding area, as well as a decreasing flank.

Further it is advantageous if each of the hangers comprises a hanger head which, in a state when the hanger is slidingly transported on the supporting rail, comprises a cross section, which is preferably round, having a center in a plane perpendicular relative to the transverse direction, and wherein a bottom side of the abutting section is arranged in a height, relative to a sliding area of the supporting rail, which is greater than a height of the center relative to the sliding area.

This arrangement ensures that an engaged hanger is pulled below the stopper for further downstream acting on the stopper such that the clips can pass the stop unit without damaging same.

It is additionally preferred if the carriage further comprises a guiding section, wherein the guiding device comprises a rail for guiding the carriage which is configured such that the guiding section of the carriage slides in the rail along the transverse direction for guiding the carriage, preferably in terms of a positive engagement.

With a particular embodiment the drive comprises a housing.

Further, it is preferred that the sliding area of the supporting rail and a bottom side of the abutting section are arranged in two planes which are distanced and arranged in parallel to each other.

With another embodiment the abutting section can be deflected flexibly in height relative to one of the clip drivers, which engages one of the hangers and just passes the stop unit, during movement to the stop position, thereby allowing the engaged hanger to move below the abutting section with regard to the conveying direction.

It is clear that the above-mentioned and hereinafter still to be explained features cannot only be used in the respectively given combination but also in other combinations or alone without departing from the scope of the present invention.

Embodiments of the invention are illustrated in the figures and will be explained in more detail in the description below.

BRIEF DESCRIPTION OF THE DRAWINGS

FIGS. 2A-2C respectively show different views of different moments during a stopping process of the stop unit in accordance with the FIG. 1;

FIGS. 3A-3E show different side views of the stop unit of FIG. 1 at different magnifications;

FIGS. 4A-4B show top views of the stop unit of FIG. 1 for illustrating the situation of FIG. 2B.

DESCRIPTION OF PREFERRED EMBODIMENTS

Figure 1A:
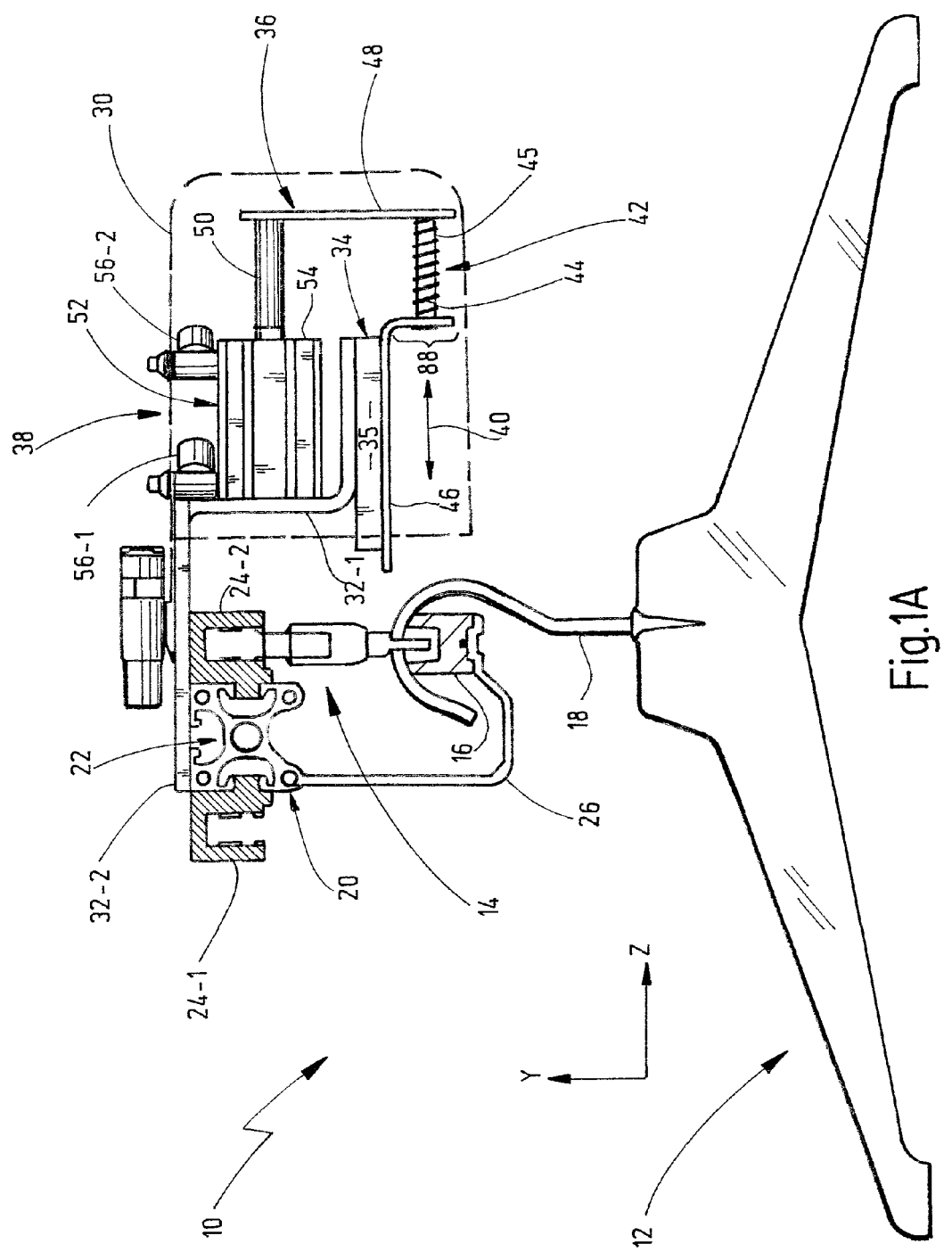
FIGS. 1A-1C show different views of an overhead conveyor in accordance with the invention.
Figure 1B:
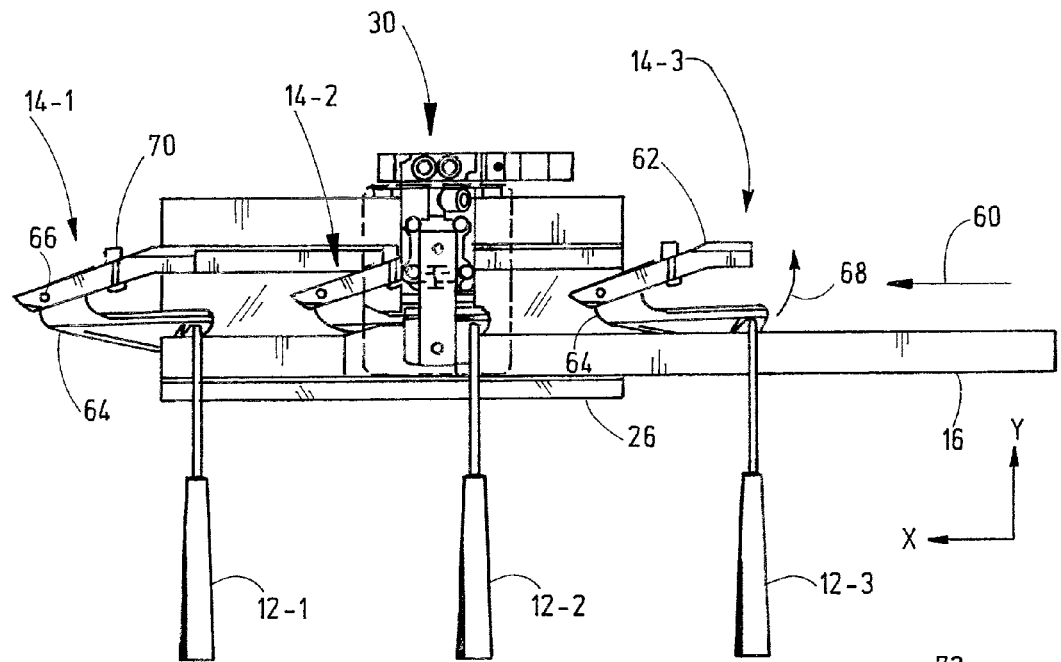
Figure 1C:
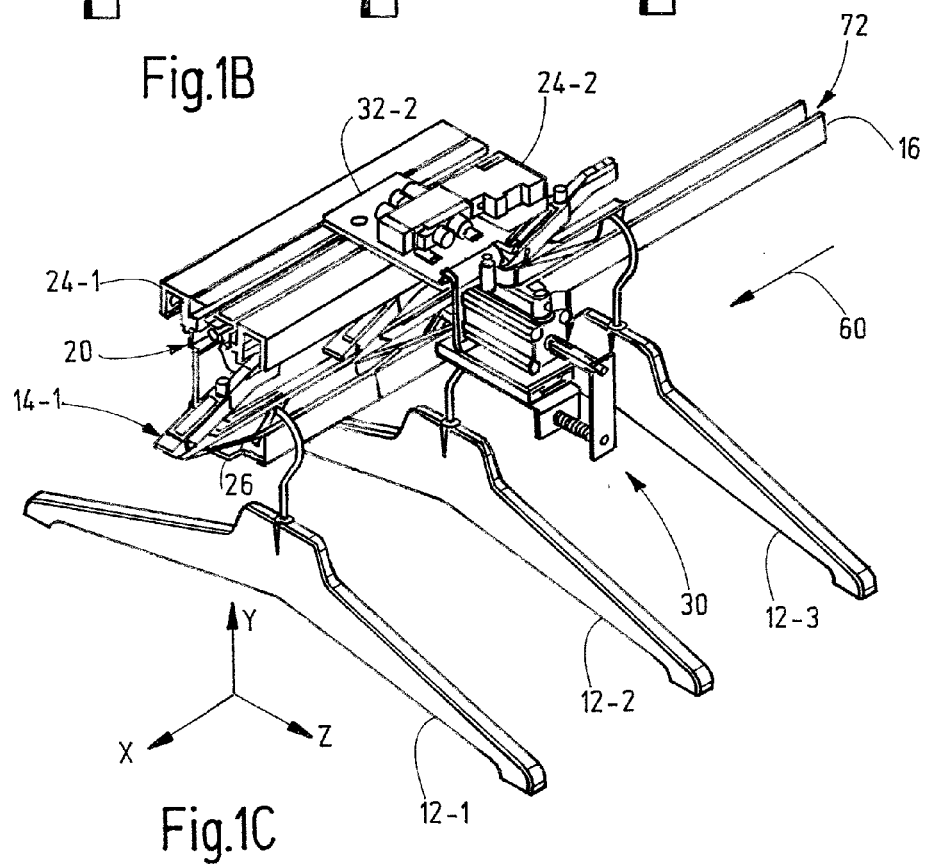

With reference to the FIGS. 1A-1C the structure of a stop unit 30 in accordance with the invention will be described below, the stop unit 30 being used with an overhead conveyor or in a conveyor system 10, wherein the description will be presented under common reference to all views of the FIGS. 1A-1C. FIG. 1A shows a front view along a longitudinal direction X, in a partial sectional view, on the overhead conveyor 10. FIG. 1B shows a side view of the overhead conveyor 10, and FIG. 1C shows a perspective view of the overhead conveyor 10 of FIGS. 1A and 1B.

Hangers 12 are transported in a sliding manner on a supporting rail 16 by means of the overhead conveyor 10 by means of clip drivers 14. The supporting rail 16 is open upwardly (to one side) for allowing receiving the clip drivers 14, at least partially, therein and guiding same in the longitudinal direction X. It is clear that arbitrary courses of curves including increases and decreases can be represented by means of the supporting rail 16, which is exemplarily shown as a straight line. For the sake of a simplified description the supporting rail 16, in the present case, is represented only as a straight line and in a horizontal attitude. The hangers 12 are sitting with their hooks 18 at two points on the supporting rail 16, having, for example, an U-shaped cross section. It is clear that with other shapes of cross section more or less contact points will be present at the hook 18, which is laterally open in a downward direction and which preferably has the round shape.

The supporting rail 16 is carried—typically over head—by means of a supporting section 20. The supporting section 20 can have one or more notches 22 (FIG. 1A) in side areas thereof for attaching additional components of the overhead conveyor 10. For example, U-shaped guiding sections 24, which are open downwardly, are inserted into the lateral notches 22 of the supporting section 20. The cross sectional shape of the guiding section 24 can be selected arbitrarily, and can be adapted preferably to the cross section of a traction member such as a conveying chain. In the guiding section 24-2 (FIG. 1A), illustrated at the right, a run of an endlessly circulating conveying chain is shown, which is connected to the clip drivers 14.

The supporting section 20 can comprise a connecting element 26 having an L-shape, the connecting element 26 supporting the supporting rail 16. It is clear that the connecting element 26 can be provided merely in a distributed manner, across the length of a conveyor track, and does not need to extend over the entire length of the supporting rail 16, which is typically formed continuously.

The stop unit 30 of the invention will be described below. The stop unit 30 can comprise one supporting element 32 (e.g., a rail, section, etc.), which can be Z-shaped, by which supporting elements 32 a guiding device 34 is fixed laterally to the supporting rail 16 on the supporting section 20. For example, the supporting element 32 can be fixed in the notch 22 in the top side of the supporting section 20. The supporting element 32 is preferably designed such that the guiding device 34 is arranged at a level of the hanger 12 in the clip driver 14, where the clip driver 14 grabs the hook 18 of the hanger 12 and, in a normal state, picks up same. In the example of FIG. 1A the guiding device 34 is provided at a bottom side of a horizontal leg of the supporting element 32, the leg being turned away from the supporting section 20. A horizontal leg 32-2 of the supporting element 32, facing the supporting section 20, is connected to the turned-away leg of the supporting element 32 via a vertical leg 32-1.

The guiding device 34 serves for receiving a supported carriage 36 (FIG. 1A), which is movable horizontally and transversely relative to the longitudinal direction X. The carriage 34 can be received in and guided by a carriage-guiding rail 35. The receipt can be achieved by positive engagement. The carriage 36, in the front view of FIG. 1A, has, for example, an L-shape with a short vertical leg and a longer horizontal leg, i.e. a stopper 46.

The carriage 36 can be extended transversely by means of a drive 38 at a level of a vertex of the hooks 18, in this case along the direction Z, at a small distance completely across the supporting rail 16, as will be described in more detail with reference to FIG. 2C below. In FIG. 1A and FIG. 2A a release position of the stop unit 30 is respectively shown, in which release position the carriage is retracted so far relative to the supporting rail 16 that the clip driver 14, particularly if hangers 12 are engaged, can pass without any collision. Movability of the carriage 36 is indicated in FIG. 1A by means of a double arrow 40 extending in parallel relative to the direction Z, which is thus oriented perpendicular relative to the longitudinal direction X. The perpendicular orientation is preferred in particular. The carriage 36, however, can also be slightly moved obliquely relative to the supporting rail 16, for example, at an angle between 70° and 89° (in the plane XZ). The guidance of the carriage 36 is taken over by the carriage-guiding rail 35, which is adapted to receive forces and forward same to the supporting section 20, the forces being orientated perpendicular relative to actuating direction 40 of the carriage 36.

The drive 38 can be positioned above the carriage-guiding rail 35 and the carriage 36, for example, in a region of the vertical leg 32-1 and the horizontal leg of the supporting element 32, which is turned away. A spring device 42 is provided between the drive 38 and the carriage 36. In FIG. 1, for example, a spiral spring 44 is shown, which extends around a shaft 45 having a shape of a cylinder, wherein the shaft 45 can penetrate through the carriage 36 via an opening 89 (upper part of FIG. 2B) in the vertical leg of the carriage 36. The shaft 45, which is orientated horizontally, is fixedly connected to a vertically arranged connecting element 48. The connecting element 48, in turn, is connected to a piston rod 50 of the drive 38, which is exemplarily implemented in terms of a (pneumatic) cylinder 52. The housing 54 of the drive 38 encloses the cylinder 52. The piston rod 50 moves in the horizontal direction Z within the cylinder 52 and thus causes the movement 40 of the carriage 36 via the connecting element 48. The connecting element 48 couples in a non-positive manner to the carriage 36 via the spring device 42. If an extension movement of the carriage 36 (movement to the left in FIG. 1A) is obstructed by an obstacle such as one of a clip driver 14 and a hanger 12, or a hook 18, the spring device 42 can be compressed. Then, the shaft 45 reaches through the carriage 36, as will be explained in further detail with reference to FIG. 2B. In this state the carriage 36 temporarily rests and thus has the option to evade the obstacle. In this manner it is achieved that destroying collisions are avoided.

It is clear that other spring devices 42 can be used instead of the spiral spring 44 such as flat springs, gas-pressurized springs, or the like.

Further, in FIG. 1A, for example, two (pneumatic) terminals 56-1 and 56-2 are illustrated for supplying pressurized air to the drive 38 or the cylinder 52.

FIG. 1B shows a side view of the stop unit 30 of FIG. 1A. Three hangers 12-1, 12-2, and 12-3 are exemplarily shown, which are transported downstream in a conveying direction 60 being oriented, for example, in parallel relative to the longitudinal direction X. The hanger 12-1, which is located the farthest downstream, has passed the stop unit 30 without being released. The center hanger 12-2 is located exactly in the region of the stop unit 30 and is still in engagement with the clip driver 14-2. The hanger 12-3, which is located the farthest downstream, is located in front of the stop unit 30 in terms of material flow.

Supporting arms 62 of the clip drivers 14 can be recognized in FIG. 1B, the supporting arms 62 being connected to a conveying chain (which is not illustrated in more detail). Respectively one clip 64 is pivotally supported beneath the supporting arms 62, the clip 64 being pivotable around a pivotal axis 66. The pivotal axis 66 is arranged in a region of a downstream located end of the supporting arm 62, and in the present case it is orientated parallel relative to the transverse direction Z. Pivotal movement 68, by which the clips 64 can be opened for disengaging the hangers 12 from the clip drivers 14, is indicated by means of an arrow in FIG. 1B. The coupling of the supporting arms 62 to the conveying chain, which is not depicted here, can be achieved via coupling elements 70.

The clip drivers 14 can be guided in a (vertical) slot 72 within the supporting rail 16, as can be recognized well in the perspective view of FIG. 1C.

With reference to FIGS. 2A-2C different states of the stop unit 30 of the invention will be described below. FIG. 2A shows different views of a classic release position. The views of FIG. 2B show a release position interpreted narrowly. The views of FIG. 2C show a stop position of the carriage 36, or the stop unit 30. Each of the FIGS. 2A-2C shows a front view (upper part) similar to FIG. 1A, a top view (center part) as well as an enlarged sectional view (lower part) of the upper front view. The enlargement is respectively indicated in the upper front view by means of a circle being designated by A, B, and C.

FIG. 2A shows the classic (normal) release position in which the carriage 36 is completely retracted in the positive direction Z with its stopper 46 by extending the piston rod 50 (FIG. 1A) correspondingly. Thus, no collision can happen between the carriage 36 and the hooks 18 of the hangers 12. All of the hangers 12-1 to 12-3 shown in FIG. 2A can pass the stop unit 30 without collision.

FIG. 2B shows the stop unit 30 at a (slightly) later time, when a superordinated (not shown) control (e.g., material flow computer) outputs a signal to the stop unit 30, which signal causes the stop unit 30 to extract the carriage 36 by retracting the piston 50 in the negative direction Z. If this command is executed at a time when the third hanger 12-3 (with the associated clip driver 14-3 thereof) just passes the carriage 36, it can happen that the stopper 46 cannot be extended completely across the entire width B (FIG. 2C below) of the supporting rail 16, but abuts against the clip driver 14-3, which is not shown in FIG. 2B, or directly against the hook 18-3 of the hanger 12-3. The carriage 36 can be moved back against the force of the spiral spring 44 (cf. arrow 90), namely along the positive direction Z, even if the driver 38 actually requires movement via the piston rod 50 into the opposite direction. The front view (upper part) of FIG. 2B clearly shows how the shaft 45 penetrates through an opening 89 in the spring contact section 88 (FIG. 1A) which is implemented by the shorter vertical leg of the carriage 36. With reference to the FIGS. 4A and 4B it will be described below in more detail how it is possible that the stopper 46 of the carriage 36 performs the retraction movement 90 although the carriage 36 is extracted in an abutting manner against one of the clip drivers 14.

FIG. 2C shows the stop position of the stop unit 30. The stopper 46 of the carriage 36 is extended so far, in the stop position, along the negative direction Z (cf. arrow 92, lower part) that the carriage 36 completely projects over the supporting rail 16 with the abutting section 84 thereof. The abutting section 84 is slightly distanced in a vertical direction (direction Y) relative to a top side of the supporting rail 16, as will be explained in more detail with reference to FIGS. 3D and 3E. The FIG. 2C shows the stop unit 30 at a later time than in FIG. 2B. The (hitten) hanger 12-3 has passed the stop unit 30 so that there is no obstacle for a complete extension movement 92 of the carriage 36 since the third hanger 12-3 and the fourth hanger 12-4 were sufficiently distanced relative to each other in the conveying direction 60. Therefore, the subsequent hangers 12-4 to 12-6 are accumulated at the abutting section 84 of the carriage 36. The abutting section 84 effects, by means of the upstream located edge thereof, that the clips 64 are rotated upwardly (cf. arrow 68) about the pivotal axis 66 (FIG. 1B) for releasing the hangers 12 while the clip drivers 14 are continuously moved in the downstream direction.

It can be recognized in the enlarged illustration of FIG. 2C that the abutting section 84 projects the supporting rail 16 over its entire width B. Thus, only perpendicular forces act on the carriage 36 which cannot initiate a retraction movement 90. A guiding section 86 of the carriage 36 follows the abutting section 84 in the transverse direction Z. The abutting section 84 and the guiding section 86 define the long leg, or stopper 46 (cf. FIG. 1A), of the L-shaped carriage 36. The guiding section 86 can comprise a spring at the top side thereof, the spring projecting upwardly and communicates, in a positive engagement, with a notch of the carriage-guiding rail 36 which is correspondingly open downwardly and not shown in further detail in FIG. 2C.

Figure 3E:
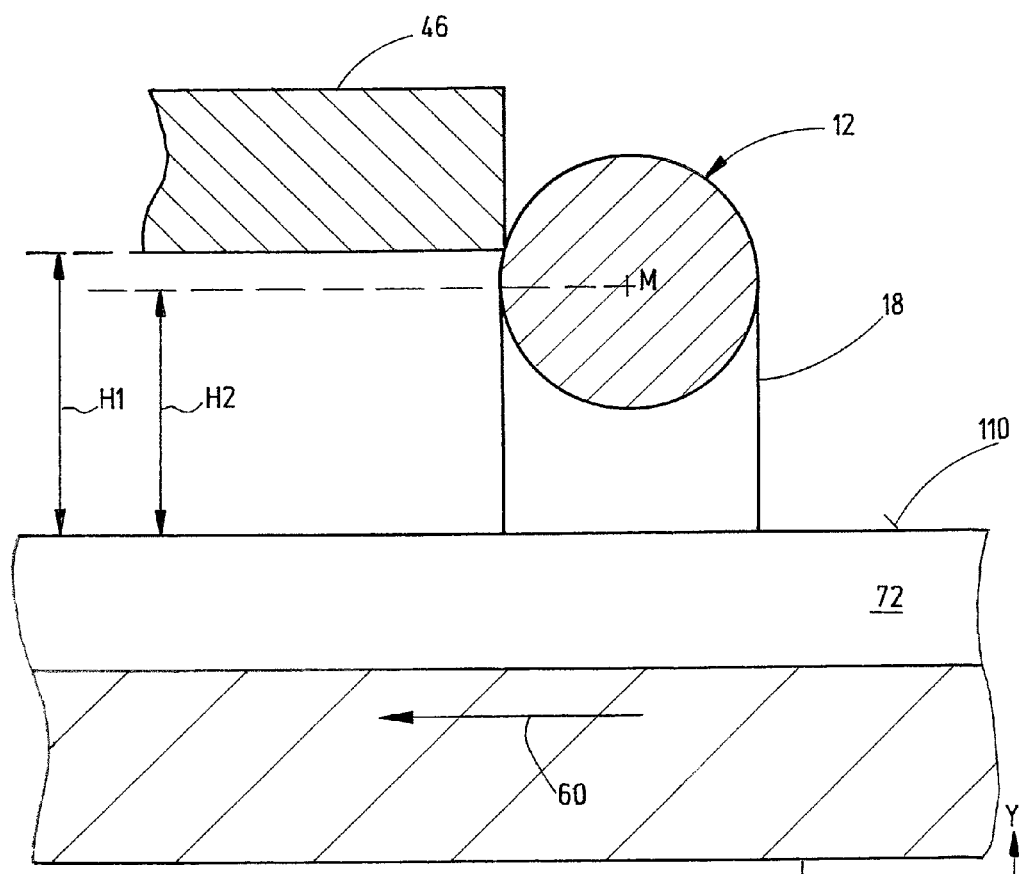

The FIGS. 3A-3E show different views of the stop unit 30 in the stop position at different magnifications. FIG. 3A shows a side view. FIG. 3B shows a top view. FIG. 3C shows an enlargement of a region surrounded by a circle in FIG. 3A. FIG. 3D shows a side view, similar to FIG. 3C, wherein only isolated parts are illustrated. FIG. 3E shows a side view of FIG. 3D which is schematized stronger.

In FIG. 3A a supporting-rail elevation 94 is shown in addition to the elements of the stop unit 30, which have been explained up to now. The supporting-rail elevation, or the "elevation", 94 is adapted to the shape of the supporting rail 16. The supporting-rail elevation 94 can replace part of the supporting rail 16, wherein the transitions between the supporting rail 16 and the supporting-rail elevation 94 should be continuous so that the supporting-rail elevation 94 does not represent an obstacle for the transportation of the hangers 12, if the stop unit 30 is in the release position. Alternatively, the supporting-rail elevation 94 can be clipped onto the supporting rail 16 from the outside. The supporting-rail elevation 94 is characterized by a rise 95, which will be explained in more detail with reference to FIG. 3D. The rise 95 projects from the top side of the supporting rail 16 and effects, together with the stopper 46 of the carriage 36 if the carriage 36 is in the stop position, a blockade of the hangers 12 in an intermediate space 96 formed between the extended stopper 46 and the top side of the supporting rail 16, as will be explained in more detail below.

In FIG. 3A a situation is shown in which the three hangers 12-1 to 12-3 have already been separated from their associated clip drivers 14, wherein merely the clip driver 14-3 is depicted in terms of its clip 64-3. The clip driver 14-3 has just been released from the hanger 12-3 so that the hanger 12-3 is disengaged from the clip driver 14-3.

FIG. 3B shows a top view of the side view of FIG. 3A.

FIG. 3C shows an enlarged illustration of a part of FIG. 3A. For the sake of a facilitated illustration only the clip 64 is shown. The clip 64 sits with its bottom side on a top side of the stopper 46 of the carriage 36 and is pulled over the top side of the stopper 46 along the conveying direction 60. The intermediate space 96 is provided between the stopper 46 and the supporting rail 16. The bottom side of the stopper 46 is located in a plane E1 extending parallel to a second plane E2, which is defined by the top side (sliding area 110) of the supporting rail 16. The distance of the first plane E1 relative to the second plane E2 corresponds to a height H1 of the intermediate space 96.

A hook nose 98, which defines a receiving region, or slot, 100 in the clip 64, lies, in the present case, above the first plane E1 and above the second plane E1 and is positioned at an upstream end of the clip 64. This merely effects that the hooks 18 are disengaged from the clip 64, i.e. released.

Further, it can be recognized in FIG. 3C that beside the third hanger 12-3, or the hook 18-3, the first hanger 12-1 and the second hanger 12-2 are already accumulated in the intermediate space 96. The rise 95 prevents the hangers 12-1 and 12-2 from leaving the intermediate space 96 in the conveying direction 60, since the intermediate space 96 tappers in the downstream direction.

The supporting-rail elevation 94 and its rise 95 are illustrated in more detail in FIG. 3D. In the side view of FIG. 3D the supporting-rail elevation 94 comprises an, relative to the supporting rail 16, increasing flank 104, a plateau which extends preferably in parallel to the supporting rail 16, as well as a decreasing flank 108. The supporting-rail elevation 94 has a length X0-X7 in the longitudinal direction X. In the supporting-rail elevation 94 has, in a first section which extends from X0-X2, an identical height like the supporting rail 16. This means that a top side of the supporting-rail elevation 94 in the region X0-X2 is located in same plane like the sliding area 110 of the supporting rail 16. The increasing flank 104 extends from X2-X3, wherein the height steadily increases up to almost H1. The plateau 106 extends from X3-X5 almost on the height H1. The plateau 106 is located slightly deeper than the bottom side of the stopper 46 of the carriage 36 for avoiding collisions. The decreasing flank 108 extends from X5-X6, wherein the height difference, relative to the sliding area 110, is again reduced to zero. An end section, which has the same level like the supporting rail 16 and which is not designated in more detail in FIG. 3D, extends from X6-X7.

The stopper 46 comprises, in a height direction Y a thickness D. The stopper 46 extends from X1-X4 in the longitudinal direction X. The relative position of the rise 95 relative to the stopper 46 is to be selected such that none of the hangers 12—in dependence on the (wire) thickness of the hook 18—can pass the intermediate space 96 inadvertently. The stopper 46 can be supported such that it slightly gives way in the positive direction Y. This will be explained hereinafter in more detail. The stopper 46 preferably overlaps at least part of the plateau 106. The height of the plateau 106 is selected such that the stopper 46, in the stop position, does not collide with the rise 95 during extension.

FIG. 3E shows the illustration of FIG. 3D in a sectional view in abstracted terms, wherein the supporting-rail elevation 94 is not shown. The illustrated sectional plane lies in the plane XY centered in the supporting rail 16 with regard to the extension thereof in the direction Z. In this case, the hook 18 comprises a circular wire. It is clear that other cross sectional geometries can be selected. A center M is at a height H2, which is located beneath the bottom side of the stopper 46, the bottom side having a height H1. The height H2 of the center M of the hook 18 is dependent on the wire diameter as well as on a diameter of the hanger head, which is located in the plane YZ (cf. FIG. 1A). In FIG. 1A the head of the hanger 18 is situated at two points on the supporting rail 16 so that the vertex of the head is located above the sliding area 110. FIG. 3E shows a sectional view along the longitudinal direction X crossing this vertex.

This specific geometry ensures that the hook 18 can dive beneath the stopper 46, if the clip 46 has not released the hook 18. This is particularly the case if the stopper 46 hits one of the clip drivers 14 at its downstream end when the stopper 46 is extended from the release position to the stop position, wherein the clip driver 14 still holds the hanger 12. The slot 100 (cf. FIG. 3C) is configured such that an engaged hanger 12 can move in the vertical direction Y.

The situation (FIG. 2B) just described generally involves the danger of damaging the overhead conveyor 10. This damage is avoided by returning the stopper 46 against the force of the spring device 42 (cf. arrow 90 in FIG. 2B, lower part) by means of the still engaged hanger 12. This operating principle will be described below with reference to FIGS. 4A and 4B, which are to be taken in common with FIGS. 3D and 3E.

The FIGS. 4A and 4B show top views at different times of the system shown in FIGS. 3D and 3E.

FIG. 4A shows a state like FIG. 2B, in which state the stopper 46 is moved from its release position to the stop position, but is hindered by the clip 64 to completely extend to the stop position. In FIG. 4A the front face of the stopper 46 abuts against a side area of the clip 64 engaging the hook 18. The stopper 46 cannot be extended further, even if the driver 48 still remains activated. The spring device 42 absorbs the force exerted by the drive 38 by compressing the spring device 42 (cf. FIG. 2B, upper part). The conveying chain (which is not illustrated here) is then moved further downstream along the conveying direction 60 until the situation shown in FIG. 4B is achieved, wherein the hook 18 is pulled beneath the stopper 46.

The stopper 46 comprises a first oblique front face 114 at the free end 112 thereof, and an (optional) second front face 116 which can be orientated in parallel relative to the side area of the clip 64. The first oblique front face 114 breaks up the rectangular geometry of the stopper 46 in the region of the free end 112. In this sense, the free end 112 lacks one "corner". This missing corner is located, in the longitudinal direction X, in a region of the supporting-rail elevation 94 where the increasing flank 104 is arranged. The first oblique front face 114 serves as a force-introduction area, which is required for returning the stopper 46 against the force of the drive 38.

As soon as the hook 18 is in contact with the stopper 46, because the conveying movement, of course, is continued, the hook 18 will be pulled beneath the stopper 46 due to the special arrangement (cf. FIG. 3E) as well as due to its geometry and the geometry of the slot 100 in the clip 64. As soon as the hook 18 has reached the increasing flank 104 (cf. FIG. 3D), the intermediate space 96 tapers. The conveying movement, however, still continues. There is a space at one (free) side opposite to the stopper 46 for moving the hook 18 in a vertical upward direction. The continued conveying movement then results in a rotational movement 120 of the hook 18, since the hook 18 is jammed by the increasing flank 104 at one of the sides which is facing the stopper 46.

As soon as the hook 18 has rotated to the position shown in FIG. 4B, the hook 18 exerts a force F onto the first oblique front face 114 which causes the retraction movement 90 (FIG. 2B, low part) of the stopper 46. Then, the path of the engaged hook 18 is free for passing the stop unit 30 in the conveying direction 60. Damage is prevented.

The first front face 114 forms an angle α together with the longitudinal direction X of the supporting rail 16. The angle α is, for example, 45° and typically lies in a range of 45°±25°.

Figure 5:
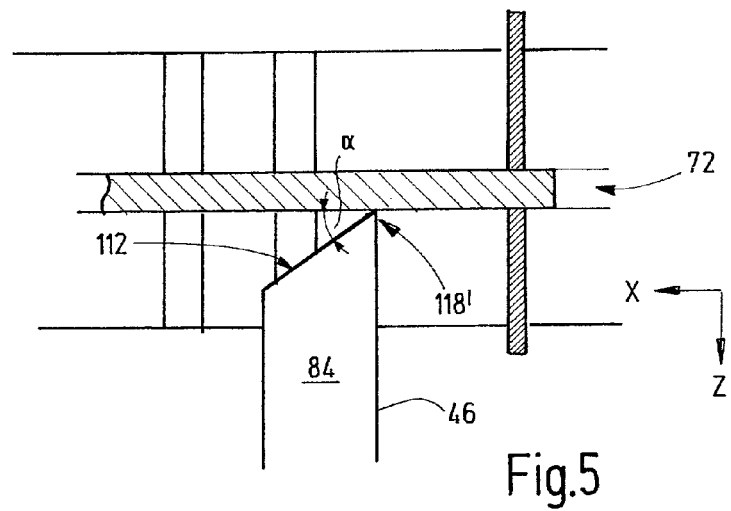
FIG. 5 shows a top view of a modified carriage.

FIG. 5 shows a modified embodiment of the abutting section 84 of the carriage 36. The front face of the stopper 46 is oriented obliquely over its entire length relative to the longitudinal direction X. The free end 112 comprises a tip 118', which is tapered to a point, whereas the tip 118 of the stopper 46 of FIGS. 4A and 4B defines a rectangular angle.

In the above description of the invention identical parts and features have been designated by the same reference numerals, wherein the disclosures contained in the entire description can be transferred to parts and features having the same reference numerals. Indications of positions such as "above", "below", "lateral", "vertical", "horizontal", etc. are related to the immediately described drawings and are to be transferred to a new position correspondingly, if position changes.

Further, it is to be noted that indications of directions and orientations were considered which, in principle, refer to the designations typically used in (intra-)logistics. Hence, the longitudinal direction (conveying direction) is designated by "X", the depth (width) is designated by "Z", and the (vertical) height is designated by "Y". A corresponding (Cartesian) coordinate system X, Y, Z can be derived respectively from the figures.

Therefore, what we claim is:

1. A stop unit for use in an overhead conveyor system which transports clip drivers in a slot of a supporting rail, the slot being open at at least one side of the supporting rail, wherein hangers are slidingly transported downstream by means of the clip drivers along a conveying direction which is orientated in parallel relative to a longitudinal direction of the supporting rail, the stop unit comprising:
   a guiding device which is mountable to the overhead conveyor;
   a carriage having an abutting section, wherein the carriage is movably supported by means of the guiding device along a transverse direction, which is orientated transversely to the longitudinal direction; and
   a drive coupled to the carriage which drive is configured to drive, during activation, the carriage from a release position, in which release position the abutting section of the carriage does not project over the supporting rail so that the hangers pass the carriage without collision, to a stop position along the transverse direction, in which stop position the abutting section projects over an entire width of the supporting rail such that the hangers (12) are released and accumulated by the abutting section while the clip drivers are continuously moved downstream;
   wherein the carriage, in an activated state of the drive, is retractable to the release position in case of an action of force along the transverse direction, and rests in a current position in case of an action of force which is only exerted along the longitudinal direction.

2. The stop unit of claim 1, wherein the abutting section comprises a free end and a first front face at the free end, which free end is orientated towards the supporting rail, wherein the first front face is orientated obliquely relative to the longitudinal direction so that the free end defines a tip at an upstream location.

3. The stop unit of claim 2, wherein the abutting section comprises a second front face which is orientated in parallel relative to the longitudinal direction and which follows upstream relative to the first front face, wherein the second front face defines the tip.

4. The stop unit of claim 1, further comprising:
   a spring device arranged between the carriage and the drive so that the carriage, in an activated state, can be returned to the release position.

5. The stop unit of claim 4, wherein the carriage comprises a spring-contact section.

6. The stop unit of claim 4, wherein the drive comprises a cylinder having a piston rod, wherein the piston rod is connected to a connecting element, wherein the connecting element is connected to a shaft which is supported free movably in an opening of the carriage, and wherein the spring device is arranged between the carriage and the connecting element.

7. The stop unit of claim 1, further comprising:
   a supporting-rail elevation which is connectable to the supporting rail and which is configured such that a height of an intermediate space between the supporting rail and the carriage, which in the stop position projects over the supporting rail, is reduced in a downstream direction so that one of the hangers, which is not engaging one of the clip drivers, penetrates the intermediate space, but cannot pass the intermediate space in the downstream direction.

8. The stop unit of claim 7, wherein the supporting-rail elevation is adapted to a shape of the supporting rail such that the supporting-rail elevation replaces part of the supporting rail.

9. The stop unit of claim 7, wherein the supporting-rail elevation is adapted to a shape of the supporting rail such that the supporting-rail elevation is clipable to the supporting rail from the outside.

10. The stop unit of claim 7, wherein the supporting-rail elevation is adapted to a shape of the supporting rail such that the supporting-rail elevation is fixable to the supporting rail.

11. The stop unit of claim 7, wherein the supporting-rail elevation comprises a rise which protrudes over a sliding area of the supporting rail.

12. The stop unit of claim 11, wherein the rise comprises an increasing flank, followed downstream by a plateau which extends in parallel to the sliding area, and then followed downstream by a decreasing flank.

13. The stop unit of claim 1, wherein each of the hangers comprises a hanger head having a cross section including a center in a plane perpendicular to the transverse direction, and wherein the abutting section comprises a bottom side which is arranged in a height relative to a sliding area of the supporting rail which is higher than a height of the center relative to the sliding area.

14. The stop unit of claim 1, wherein the carriage further comprises a guiding section, and wherein the guiding device comprises a carriage-guiding rail configured such that the guiding section slides along the transverse direction.

15. The stop unit of claim 1, wherein the drive comprises a housing, and wherein the guiding device is coupled to the housing.

16. The stop unit of claim 1, wherein a sliding area of the supporting rail and a bottom side of the abutting section are located in two different planes which are parallelly distanced to each other.

17. The stop unit of claim 1, wherein the abutting section is deflectable flexibly relative to one of the clip drivers, which engages the hanger and which just passes the stop unit, during movement to the stop position in a height which allows the engaged hanger to move beneath the abutting section in the conveying direction.

* * * * *